United States Patent Office 3,014,655
Patented Dec. 26, 1961

3,014,655
ANALOGUE DEVICES FOR DETERMINING THE PARTIAL DERIVATIVES OF A FUNCTION OF SEVERAL VARIABLES
Jean Borrel, Maisons-Laffite, Paul Braffort, Paris, Pierre Janot, Gif-sur-Yvette, and Jacques Pottier, Courbevoie, France, assignors to Commissariat a l'Energie Atomique, Paris, France, a State administration of France
Filed Apr. 9, 1958, Ser. No. 727,345
Claims priority, application France Apr. 12, 1957
7 Claims. (Cl. 235—61.6)

The advancements of sciences and technique have stimulated the research of methods and means for the rapid solving of more and more complicated calculations and it is why, besides automatic arithmetic or digital computers dealing with numbers, physical or analogue computers, also automatic, were designed; in such analogue computers, the functioning of a physical system is generally studied by means of another physical system subject to the same laws, i.e. solving the same equation or system of equations, but with other variables and with initial and boundary conditions deduced from the corresponding conditions of the system under study. By such a transposition or analogy, a difficult or even directly insoluble physical system is reduced to another system, often of the electrical type, which is easier to study and giving directly measurable results through measuring apparatus or meters or even results plotted as graphical curves.

Among the systems which have been studied until now by analogue methods, some of the most important are those ruled by partial derivatives equations and involving vector fields. For the study of such systems, it has been proposed to use an electrolytic tank filled with a very weak electrolyte, such as tap water; electrodes immersed in the electrolyte feed generally an alternating current thereto, thereby imposing on the electric potential of said electrolyte boundary conditions corresponding to the boundary conditions of the system under study, whereas a probe, dipping in the liquid and comprising generally three wires located at the corners of a right-angled isoceles triangle, performs the measurement of the potential differences or gradients along a couple of directions disposed at right angles (e.g. in the $x$- and $y$-directions) and accordingly of voltages proportional to the partial derivatives of a function of the system under study.

The prior art trajectory plotters or simulators were designed by combining a partial derivative generator including an electrolytic tank with a conventional differential analyzer or computer which handles the partial derivatives received from said generator according to the equations of the system under study, the output of said analyzer being for example plotted as a curve and/or applied to the probe of said generator in order to perform the positioning thereof and consequently the continuous running of the trajectory plotter.

Such plotters with an electrolytic tank are well known for the measurement of a gradient field deriving from a potential analogically reproduced in said tank and/or for plotting the trajectory of particles.

More specifically, in order to plot the electron trajectories in a given apparatus under study, it is sufficient to solve, for these electrons, the basic equation:

(1) $$\vec{F} = m\vec{\gamma}$$

wherein $\vec{F}$ = applied force, $m$ = mass and $\vec{\gamma}$ = acceleration

If the problem can be reduced to a plane problem (the position of an electron being represented by the coordinates $x$ and $y$), which is often the case for symmetry reasons, the vectorial Equation 1 corresponds (when the electrical field constitutes the main action and when relativity is neglected) to a system of two partial derivative equations:

(2) $$\begin{cases} -e\ Ex = m\dfrac{d^2x}{dt^2} \\ -e\ Ey = m\dfrac{d^2y}{dt^2} \end{cases}$$

wherein $e$ is the electrical charge of the electron, $t$ the time and $Ex$ and $Ey$ (which are functions of $x$, $y$) the components of the electrical field respectively according to the $x$ and to the $y$ axes, said components being (in the case of a simulator device with an electrolytic tank) respectively proportional to the partial derivatives $$\frac{\delta U}{\delta x}\ \text{and}\ \frac{\delta U}{\delta y}$$

(U being the electrical potential of the tank) due to the analogy.

The conventional auxiliary analyser or computer receiving values proportional to $$\frac{\delta U}{\delta x}\ \text{and}\ \frac{\delta U}{\delta y}$$

determined by the three wires of the probe calculates through two successive integrations $x$ and $y$, as the system (2) has the following solution:

(3) $$\begin{cases} x = \int_0^t \left( Vx - \dfrac{e}{m}\int_0^t Ex\,dt \right) dt \\ y = \int_0^t \left( Vy - \dfrac{e}{m}\int_0^t Ey\,dt \right) dt \end{cases}$$

$Vx$ and $Vy$ being the components (along $Ox$ and $Oy$) of the initial velocity and $$\frac{e}{m}$$

the charge-to-mass ratio for an electron, the value of which is well known. In fact the computer is merely an integrator of any suitable type known in the art.

Automatic electron trajectory plotters involving, on the one hand, an electrolytic tank with a probe for determining $Ex$ and $Ey$ and, on the other hand, an auxiliary differential analyser or integrator receiving from said probe voltages proportional to $Ex$ and $Ey$ and delivering voltages proportional to $x$ and $y$ (relatively to suitable axes $Ox$ and $Oy$) are described for example in the following periodicals: "The Proceedings of the Institution of Electrical Engineers," vol. 99, page 169, 1952 (article by Sander, Oatley and Yates), "Journal of the Association for Computing Machinery," vol. 2, page 28, 1955 (article by Logan, Welti and Sponsler) and "Electronics," vol. 29, pp. 210 and 216, March 1956. Further the article by Sander, Oatley and Yates gives a reference (Crank: The Differential Analyser, Longmans, Green and Co., London, 1947) concerning a suitable differential analyser, which is an integrator making use of mechanical integrating tables.

But such electrolytic tanks have several drawbacks: they have often a very large size; they produce polarization voltages at the wires of the probe; they cause measurement errors due to the electrolyte evaporation, to the variation of the immersion of the wires and to the incorrect angular position of the probe.

Furthermore, when similar problems are frequently occurring, the stocking of many tanks necessitates a large space.

At last, it is very difficult to provide an easy variation, e.g. as a function of time, of the boundary conditions in an electrolytic tank; such difficulty is an important drawback for the study of special fields with boundary conditions which vary in the course of time.

The present invention has for its object to obviate the afore-mentioned drawbacks by using, instead of an electrolytic tank, an electrical network of convenient design so that each node thereof represents a point of the system under study; it is sufficient therefore to read the voltage difference between two adjacent nodes for determining a quantity substantially proportional to the partial derivative considered along the line passing through said two nodes. Boundary conditions are imposed on the network by conducting analogue images of one or several sections of the system under study on which the real boundary conditions are imposed, said images being realized in a current-conducting material and brought to a potential corresponding to the boundary conditions, and current-conducting brushes connecting said images to the corresponding nodes of the network.

Of course it would be possible to provide stationary conducting images and network, the voltage increments between adjacent nodes of the network being read by a voltage reader mobile along two directions (which are advantageously at right angles and may represent e.g. the x-and y-directions), but it is more convenient to maintain stationary only the network and to provide for the movement of the conducting images along a first direction and the movement of said reader along a second direction, advantageously perpendicular to said first direction.

It is therefore an object of the invention to provide a simple and accurate analogue device for determining the partial derivatives of a function of at least two variables.

It is another object of the invention to provide a rugged device which, when cooperating with an auxiliary conventional integrator or differential analyser, plots directly the trajectories of particles in a given, even variable, field.

It is a still further object of the invention to provide a simulator of vector fields enabling to solve rapidly problems involving vector fields.

It is also an object of the invention to provide a device of the above-mentioned type comprising easily interchangeable elements which enable the solving of various problems involving partial derivatives, said interchangeable elements being easily stocked.

It is another object of the invention to provide a device of the above-mentioned type wherein the boundary conditions are easily varied, e.g. in course of time.

An analogue device according to the invention for determining the values of the partial derivatives of a function of at least a first and a second variable is designed to cooperate with an auxiliary conventional computer capable of determining the actual values of said variables corresponding, in an equation system including said partial derivatives, to the determined values of said partial derivatives and comprises: an electrical network having a plurality of nodes disposed along several lines, each node representing one point of a section of the space wherein said function is defined; a base element arranged for relative movement in a first direction with respect to said network according to the variation law of said first variable and carrying an homologue image of said section as at least one current-conducting zone; means for imparting on each current-conducting zone at each moment the potential corresponding to the boundary conditions of said function in said space; a plurality of gliding current-conducting leads connecting each node of said network to a corresponding point of said base element; a voltage reader arranged for movement in a second direction relatively to said network according to the variation law of said second variable and reading the voltage differences existing, on the one hand, between a pair of adjacent nodes disposed along said first direction and, on the other hand, between one of the nodes in said pair and a third node adjacent thereto disposed along said second direction; means for transfering to said auxiliary computer said voltage differences; means receiving from said computer a first control voltage, which is a function of the calculated value of said first variable, and ensuring the relative movement between said base element and said network under the control of said first control voltage; and means receiving from said computer a second control voltage, which is a function of the calculated value of said second variable, and ensuring the movement of said reader, under the control of said second voltage.

A trajectory plotter or simulator comprising such a partial derivative generator and an associated computer allows the solving of differential equation systems concerning vector fields, in particular those concerning the phenomena for which the problem can be reduced to a plane problem involving two dimensions or variables, either in right-angled coordinates $(x,y)$ or in cylindrical coordinates $(r,z)$ for a problem enjoying a revolution axis.

The invention has many fields of application and among them the solving of the problems concerning particle accelerators as electron accelerators.

With the foregoing and other objects in view which will appear as the description proceeds, the invention resides in the combination and arrangement of parts and in the details of construction hereinafter described and claimed, it being understood that changes in the precise embodiment of the invention herein disclosed for illustrative purpose only can be made within the scope of what is claimed without departing from the spirit of the invention.

Let us first consider for example a system which can be reduced to a plane system (involving right-angled $x$, $y$ coordinates) wherein surfaces $Si$ are submitted to potentials $Ui(t)$ which are generally variable in course of time, the problem to be solved consisting in finding, for each point having the coordinates $x(t)$ and $y(t)$, the values of $$\frac{\delta U}{\delta x} \text{ and } \frac{\delta U}{\delta y}$$

Of course surfaces $Si$ are physical surfaces limiting bodies or elements as electrodes, plates, tubes etc.

Therefore, according to the invention, conducting zones $s_i$, which are images (by analogy) i.e. generally sections along given planes of the surfaces $S_i$, are painted on a paper base or band and said zones $s_i$ are brought to potentials $kUi$ ($k$ being a constant) by means of conducting strips painted on the paper band.

On the other hand, an electrical network is built, according to known methods, with a plurality of resistors between nodes, each node being provided with a conducting brush in electrical contact with said paper band. Said network is so designed that each node represents a point $m$ which is an image (by analogy) of a point M, that the potential at each point $m$ is proportional to the potential $U[x(t), y(t)]$ of the corresponding point M $(x,y)$ and that the brushes which are in contact with surfaces $s_i$ impart potentials $kUi$ to the corresponding nodes, thereby introducing the boundary conditions.

The potential or voltage difference between a pair of adjacent nodes in the $x$- and $y$-directions is then proportional to $$\frac{\delta U}{\delta x} \text{ and } \frac{\delta U}{\delta y}$$

respectively. If a voltage reader is moved relatively to the paper band according to the law $[x(t), y(t)]$, it will therefore deliver, at any moment, two signals respectively proportional to $$\frac{\delta U[x(t), y(t)]}{\delta x} \text{ and } \frac{\delta U[x(t), y(t)]}{\delta y}$$

if it senses the potentials of said nodes.

Practically, the theoretical network hereinabove defined can be replaced by a smaller network adapted to each problem and neglecting the influence of the distant boundaries on the potential of any point comprised in the reduced network.

Figure 1:
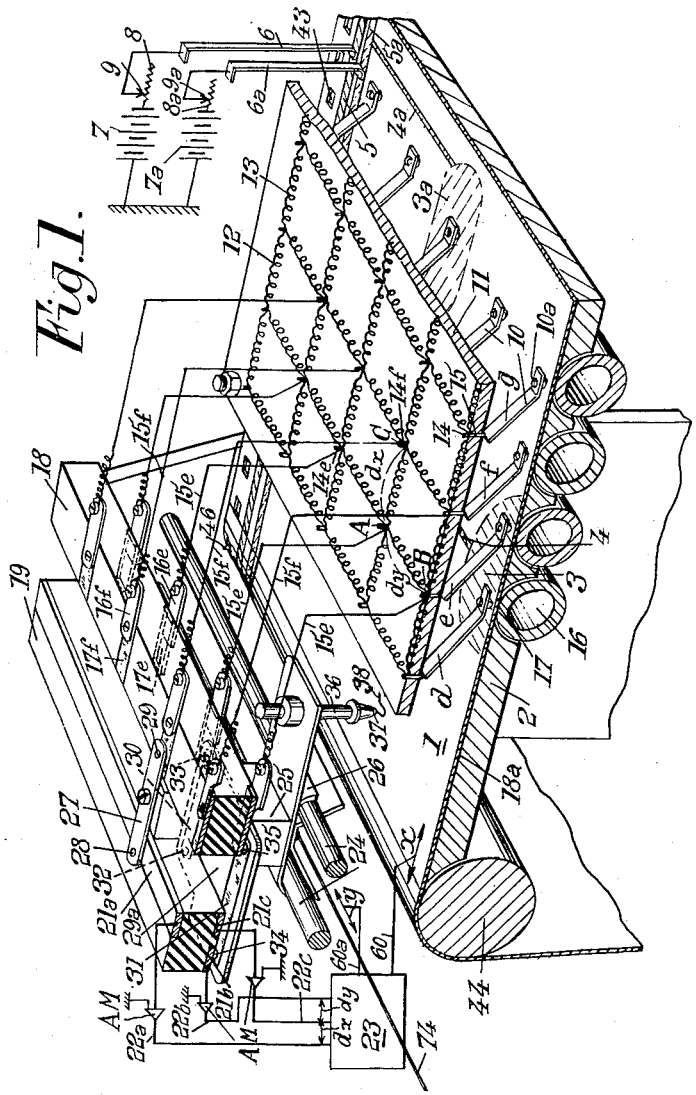
FIG. 1 is an isometric projection of the main portion of the partial derivatives generator with the associated computer.

On FIG. 1 are reproduced the main elements of the partial derivatives generator according to the invention. A paper band 1, which can be moved in each of the directions shown by double arrow $x$ on a table 2, carries conducting zones $s_1$, two of which were represented in 3 and 3$a$; said zones 3, 3$a$ are electrically connected by transversal bands or strips 4, 4$a$ to lateral longitudinal band or strips 5, 5$a$ respectively, the conducting portions 3, 3$a$, 4, 4$a$, 5, 5$a$ being e.g. painted on paper band 1 by means of a conducting paint; each zone or surface 3, 3$a$ is brought to the desired potential (which depends upon the boundary conditions of the system under study) by means of stationary brushes 6, 6$a$ fed by voltages which can be variable (e.g. as functions of the output of a computing machine which may be integrated to the auxiliary computer 23). It is possible for example to provide, as shown on FIG. 1, voltage sources 7, 7$a$ feeding potentiometers 8, 8$a$ having sliders 9, 9$a$ which are adjustable by any known means (and even manually) in order to perform the desired variation in course of time of the potentials applied to zones 3, 3$a$, thereby enabling an easy variation of the boundary conditions.

The paper band 1 cooperates with a series of contact brushes 10 provided at their ends with rollers 10$a$ and disposed along several rows or lines, (the lines $d$, $e$, $f$, $g$ being shown on the drawings).

The whole of the brushes 10 is carried by a plate 11 on which is fixed a network 12 essentially constituted by resistors 13 preferably disposed along two sets of lines at right angles of each other, the lines of each set being at equal distance from one another (said distance being for instance 1 cm.), each of the nodes 14 of the network being electrically connected through a rod 15 to a brush 10.

Network 12 is arranged in a known manner so that every node 14 represents a point $m$ of the section of the plane in which the desired phenomenon is studied, the network being consequently the analogical image of the phenomenon to be studied, the voltage at any node $m$ of the network corresponding to the value of U at the point M corresponding to $m$.

In this arrangement the boundary conditions are applied at any node 14 by brushes 10 which come into contact with conducting surfaces, such as 3 and 3$a$, brought to the desired potential which may be variable.

In order to ensure both a good drive of band 1 and satisfactory contacts between brushes 10 and the conducting surfaces, table 2 is provided with transverse cylinders 16 disposed under every row of rollers and having an upper generatrix 17 flush with the top surface 18$a$ of table 2, so that band 1 is held between cylinders 16 and rollers 10$a$ when moving. As for the drive and the tensioning of the paper band 1, they will be referred to in more detailed fashion hereinafter with reference to FIGS. 2 to 4.

Still with reference to FIG. 1, it will be seen that each of the nodes 14$e$ and 14$f$ of the rows $e$ and $f$ of brushes is connected, through an electric conductor 15$e$ and 15$f$ respectively, with a small plate 16$e$ and 16$f$ respectively fixed on the conducting bands 17$e$ and 17$f$ incorporated in an insulating bar 18 flush with the upper and lower surfaces of said bar.

Figure 2:
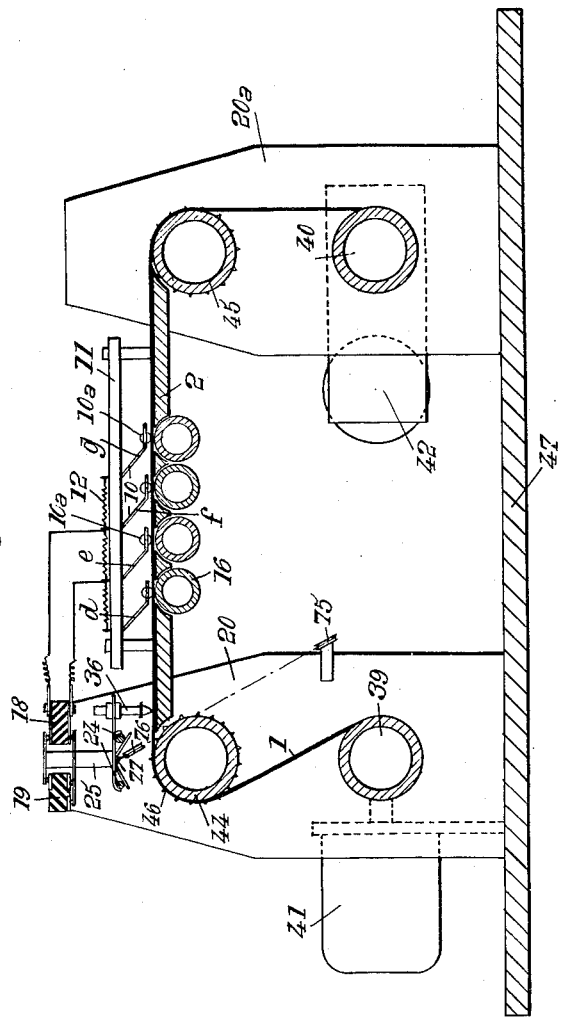
FIG. 2 shows, partially in vertical section and partially in elevation, the whole generator.
Figure 3:
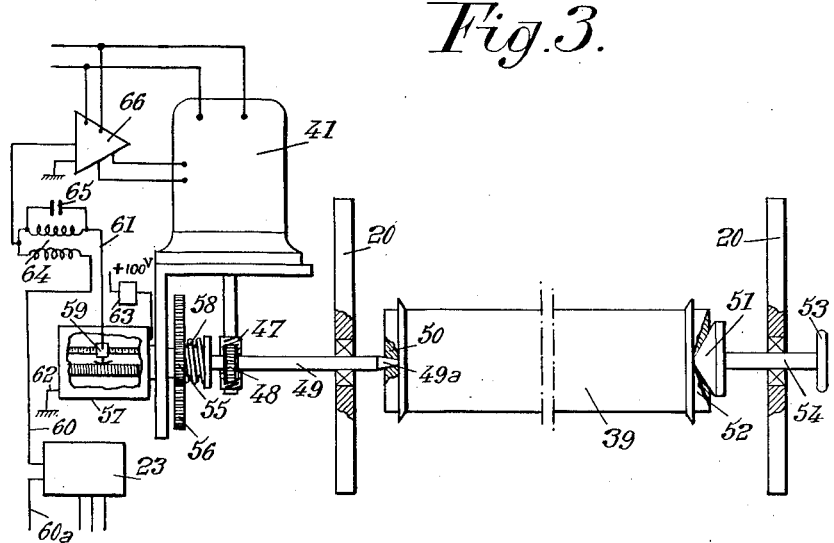
FIGS. 3 to 5 are side views of mechanisms ensuring respectively the motion of the base element, the suitable tension of said element and the motion of the voltage reader.

This insulating bar 18 and a similar insulating bar 19 are fixed with respect to network 12 and to table 2, being carried by two side plates 20 visible on FIGS. 2 and 3.

In bar 19 are incorporated three longitudinal conductor strips 21$a$, 21$b$ and 21$c$ (flush with the upper and lower surfaces of said bar) which are connected, through lines 22$a$, 22$b$, 22$c$, to the input of the auxiliary computer or calculator 23, impedance changing amplifiers AM of any suitable type being provided on the lines.

The fixed portion of the generator of partial derivatives, shown on FIG. 1, also includes two parallel rails 24 also carried by said plates 20 and on which can move a carriage 25 provided with shoes or similar means 26 running on said rails. Carriage 25 forms the partial derivatives reader or voltage reader proper which comprises for this purpose: at the top, a conductor plate or bridge 27 carrying two contacts 28 and 29, the first one sliding on strip 21$a$ and the second one cooperating successively with the different conducting bands 17$f$; and, at the bottom, a small plate 29$a$ which comprises two conductor bridges 30 and 31, each of which bears a pair of contacts. Bridge 30 carries two contacts 32 and 33, the first one sliding on strip 21$c$ and the second one cooperating successively with the different conductor bands 17$e$, whereas bridge 31 carries a first contact 34 sliding on strip 21$b$ and a second contact 35 cooperating successively with the different conductor bands 17$e$.

Owing to this arrangement, strip 21$a$ and consequently conductor 22$a$ receives the voltage existing at one of the nodes 14$f$ of row $f$, to wit the node that is connected with the conducting zones 17$f$ on which bears contact 29, whereas strips 21$b$ and 21$c$ receive the voltages existing at two adjacent nodes 14$e$ of row $e$, to wit those connected with the two conducting bands 17$e$ on which contacts 31 and 35 are bearing.

Carriage 25 also carries a stylus 36, e.g. of the ball-pen type, the point 37 of which traces a curve 38 on the paper band 1.

FIGS. 2 to 5 illustrate the means for driving the paper band 1 in direction $x$ and those for moving carriage 25 in direction $y$, at right angles to $x$, in response to the data supplied by computer 23 as diagrammatically shown on FIG. 1. Computer 23 which receives the values of the partial derivatives determined by the analogue device according to the invention and solves an equation system of the type (3) including said partial derivatives, may be of any type known in the art adapted to solve the involved equation system. Of course most of the large modern analogue computing machines of the differential analyser type may be used. Among the suitable differential analysers available, the following may be cited: Djinn manufactured by Etablissements Derveaux (France), OME–EL2 and OME–P2 manufactured by the Société d'Electronique et d'Automatisme (France), 131R manufactured by PACE Corp. (U.S.A), REAC manufactured by Reeves Corp. (U.S.A.).

The displacement of paper band 1 is performed (FIG. 2) by driving drums 39 and 40 actuated by motors 41 and 42 respectively as will be more explicitly described hereinafter with reference to FIGS. 3 and 4. Paper band 1 which is provided with lateral holes 43 (visible on FIG. 1) passes on guiding rollers 44 and 45, the edges of which are provided with small projections or teeth 46 cooperating with holes 43. This guiding is similar to that employed in some photographic cameras making use of 35 mm. films. Of course table 2 is disposed with respect to guiding rollers 44 and 45 in order that band 1 be suitably positioned on said table 2 as shown by FIG. 2.

Said FIG. 2 also shows network 12, bars 18 and 19 and carriage 25 movable on its rails 24, the whole being supported by side plates 20 and 20a fixed on a base 47.

Motor 41, which drives the paper band (FIG. 3), controls, through an endless screw 47 and a toothed wheel 48, the rotation of a shaft 49 having an end 49a in the form of a screw-driver engaged in a corresponding recess 50 provided in drum 39. Thus drum 39 is driven without play from motor 41; the perfect centering of drum 39 is ensured by a conical member 51 engaging a corresponding conical hole 52 provided in drum 39, a control screwing-wheel 53 being fixed on the shaft 54 of said member.

As shown by FIG. 3, shafts 49 and 54 are carried by side plates 20.

Shaft 49 also carries a toothed wheel 55 in mesh with the toothed wheel 56 which controls the displacements of the slider 59 of a potentiometer 57, a spring torque limiter 58 being provided to limit the speed of displacement of said slider 59.

The positioning of drum 39 and consequently of paper band 1, under control of one of the outputs of computer 23, to wit the output 60 giving the position of band 1 (for instance the coordinate $x$ in the case of a problem in a plane $x,y$), is achieved by comparing this output 60 with the output 61 of the slider 59 of potentiometer 57 between the ends of which there is provided a potential difference of $\pm 100$ volts (one of these ends being grounded through a conductor 62 and the other being placed at a potential of $\pm 100$ volts through a reverser 63).

The comparison between the potentials at 60 and 61—which ensures the transformation of the output voltage 60 into angular rotations of drum 39—is ensured through any suitable means, for instance by means of a comparator 64 including a by-pass condenser 65 which avoids sudden variations of voltage at the passage of one of the plates 27 or 30 from one conducting band 17f or 17e to the other. The output of comparator 64, amplified in amplifier 66, controls the rotation of motor 41 either in one direction or in the other, so as to move in the desired direction drum 39 and slider 59 until the voltages at outputs 60 and 61 are equal, that is to say until said drum 39 has moved the paper band into the position controlled by the output 60 of computer 23.

In view of the fact that the paper band may be caused to move either forward or backward in the direction $x$, it is necessary to provide a device ensuring a suitable tensioning of the paper. This device shown on FIG. 4 includes an asynchronous motor 42, driving through gearwheels 67, a shaft 68 which drives drum 40 without play, the arrangement of drum 40 being similar to that of drum 39 (therefore on FIG. 4, the same reference numerals 49a, 50, 51, 52, 53 and 54 of FIG. 3 are used to designate equivalent elements). A friction clutch 69 ensures the correct drive of drum 40 from motor 42 while avoiding any risk of tearing the paper band.

Figure 4:
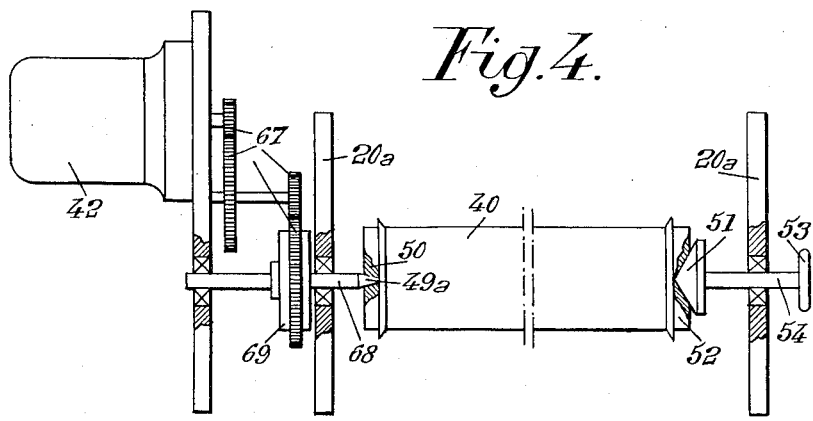

With the arrangement of FIGS. 2, 3 and 4, paper band 1 can be driven either forward or backward in direction $x$, the paper being perfectly maintained in tension on table 2. An accuracy of the order of 1/1000 is obtained, the maximum velocity of movement of the paper band being 5 cm. per second for a length of 3 meters.

Figure 5:
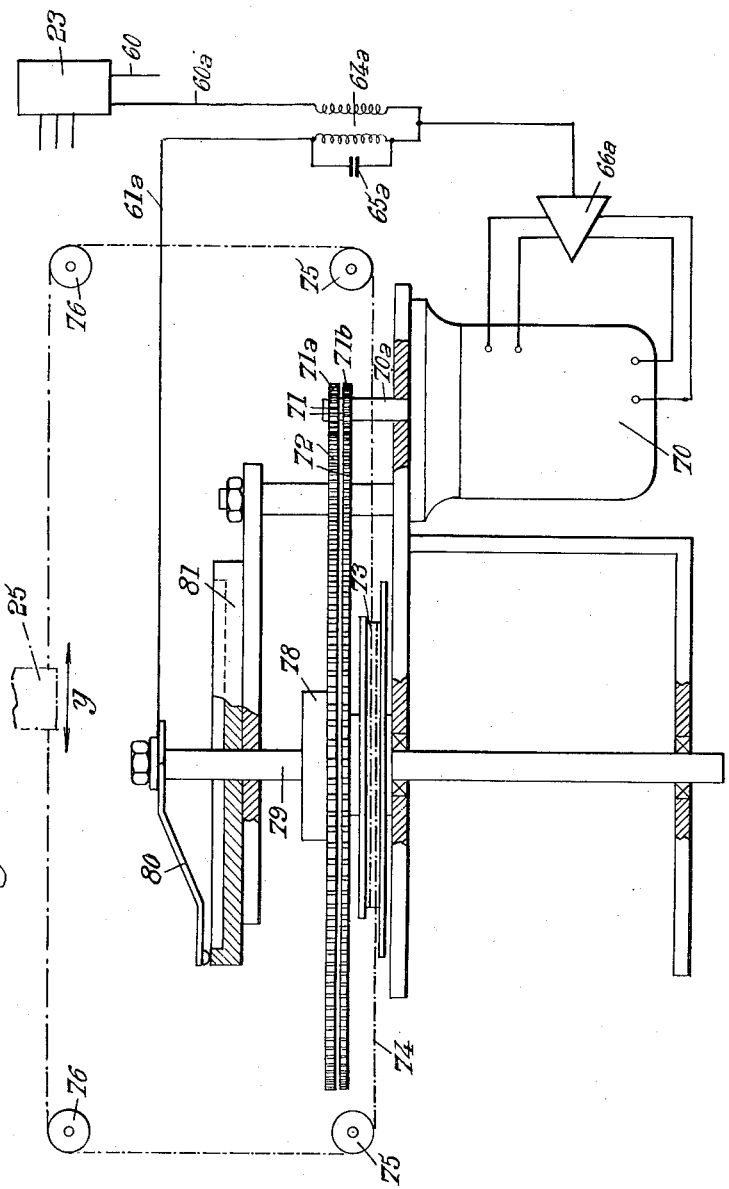

Concerning now the drive of carriage 25, either forward or backward in the direction $y$, an arrangement somewhat analogous to that of FIG. 3 may be used as shown by FIG. 5.

The means for driving carriage 25 include an electric motor 70 driving without any play a drum 73 through a pair of double toothed wheels 71—72. Toothed wheel 71 is constituted by two halves such as 71a, 71b, one of which 71a is keyed on shaft 70a whereas the other 71b is urged to rotate through a limited angle with respect to the first half 71a under the effect of a spiral spring (not visible on the drawing). Accordingly, in operative position, the corresponding teeth of the wheels 71a and 71b are placed apart so that they can mesh wholly and without play with the cooperating teeth of the two halves of the double toothed wheel 72. On the drum 73, rigid with the wheel 72 there is wound a cable 74 which passes round pulleys 75 and 76 and is fixed at 77 on the carriage 25 (FIG. 1), so that rotation of drum 73 causes carriage 25 to move.

The double toothed wheel 72 also drives, through a torque limiter 78, a shaft 79 on which is fixed the slider 80 of a potentiometer 81 having a gaged wire. Although the arrangement of potentiometer 81 is somewhat different from that of the potentiometer 57 of FIG. 3, slider 80 is brought into suitable position under control of one of the outputs of computer 23 in a manner analogous to the operation of slider 69. As a matter of fact, a comparator 64a is connected on the one hand to the output 60a of computer 23 and on the other hand to the output 61a of slider 80. The difference between the two voltages supplied at 60a and 61a is amplified at 66a and serves to control the rotation in one direction or the other of the shaft 70a of motor 70. Consequently, when the voltages at outputs 61a and 60a are different, slider 80 rotates through the angle necessary to reduce to zero this difference, this rotation of slider 80 being concomitant to that of drum 73 which ensures the drive of carriage 25.

As in the case of potentiometer 57, the ends of the resistance of potentiometer 81 are placed at potentials having between them a fixed difference, such for instance as $\pm 100$ volts, through a reverser.

The time of response for the displacement of the carriage averages 3 seconds and the accuracy $\frac{1}{1000}$.

The operation of the device as above described is as follows:

The paper band 1 moves either forward or backward as indicated by the double arrow $x$, being driven by drum 39 under control of the output voltage 60 of computer 23 and it is maintained in tension by drum 40. During this time, the other voltage 60a of the same computer produces, through motor 70, the frontward or backward displacement of carriage 25 in the direction indicated by the double arrow $y$. As above stated, each of the conducting bands 17e and 17f is at the potential of the corresponding nodes 14e and 14f, these nodes being themselves at a potential equivalent to that existing at the corresponding points of the space to be studied. The boundary conditions of some of the nodes 14 are imposed, through brushes 10, by the zones such as 3 and 3a brought to a suitable potential (generally variable) by elements 7, 8, 9 and 7a, 8a, 9a respectively.

Every time carriage 25 occupies a different position, that is to say when its contact studs 29, 33 and 35 are located on the conducting bands 17e and 17f (on FIG. 1, these conducting bands have been shown for the sake of clarity at a much greater distance than that at which they are truly located), conductor bridges 27, 30 and 31 transmit the potential to conductor strips 21a, 21c and 21b respectively.

It will be found that elements 27, 30 and 31 are brought to the potentials existing at one node 14f (to wit that designated by letter C) and at two adjacent nodes 14e (to wit those designated by letters B and A) the coordinates of which are respectively $(x+dx, y)$, $(x, y+dy)$ and $(x, y)$.

Consequently, the outputs of strips 21a, 21b and 21c correspond to the potentials existing at the apexes of an isosceles right-angled triangle ABC. The difference of potential between A and C indicated by $dx$ is proportional to the partial derivative with respect to $x$ of the function U to be studied, whereas the potential difference between A and B indicated by $dy$ is proportional to the partial derivative with respect to $y$ of the same function U, this function having been transformed by analogy into the electrical potential, to wit that existing in network 12, the boundary conditions corresponding to those of the problem to be solved being applied to this network as above explained.

Consequently, computer 23 receives the suitably amplified potentials $dx$ and $dy$ and it solves the above cited Equations 3 (in which $Ex$ and $Ey$ are respectively proportional to $dx$ and $dy$) by supplying at 60 and 60a voltages respectively proportional to $x$ and $y$. These voltages serve to drive in the suitable direction, on the one hand, band 1 and, on the other hand, carriage 25 through devices (shown on FIGS. 3 and 5 respectively) which transform the output voltages at 60 and 60a into angular rotations of the control drums 39 and 73.

In particular, concerning the drive of paper band 1, any difference existing between the voltage at 60 and the voltage at 61 delivered by slider 59 has for its chief effect to start motor 41 which drives drum 39 so that the latter occupies a position which corresponds to the valve of $x$ at this time. The voltage at 60a acts in the same manner and the difference between its value and that of the voltage at the output 61a of slider 80 starts motor 70 which drives drum 73 so as correctly to position carriage 25 so that it occupies the position corresponding to the value of $y$ at this time.

Consequently at any time, computer 23 receives values proportional to $$\frac{\delta U}{\delta x} \text{ and to } \frac{\delta U}{\delta y}$$

and deduces $x$ and $y$ therefrom in accordance with the initial conditions (initial positions and velocities of band 1 and carriage 25).

The whole of the apparatus therefore constitutes a field simulator and a trajectory tracer constituted by a generator of partial derivatives proper which effects a transposition and by the computer or analyser 23 to which may possible be incorporated the auxiliary computer which varies the voltages applied on brushes 6 and 6a. As the displacements of carriage 25 depend upon $y$ and those of paper 1 depend upon $x$ (with respect to the fixed portion including network 12), the point 37 of stylus 36 moves with respect to paper 1 in such manner as to trace thereon a curve 38 corresponding to the trajectory in a fixed plane.

It will be understood that such a simulator permits of solving problems bringing into play systems of differential equations with several variables which may be corresponding to a bi-dimensional space. Up to now, reference has been made to a plane space $x$, $y$. The same apparatus may be used for problems of revolution about one axis, for instance for studying linear accelerators for particles, the axis of revolution being the axis of the accelerator. The problem is reduced to a bi-dimensional problem bringing into play the radius or distancee $r$ from the axis of revolution and the abscissae $z$ along said axis. For such problems, the computer 23 must solve the system of equations:

(4) $$\begin{cases} \dfrac{md^2r}{dt^2} = Fr \\ \dfrac{md^2z}{dt^2} = Fz \end{cases}$$

in which $Fr$ and $Fz$ are the radial and axial components of the force applied to the particles of mass $m$. The solutions $r$ and $z$ of this system are entered into the generator of partial derivatives in the form of electric signals proportional to $r$ and $z$, account being of course taken of the initial conditions which determine the position of the reader.

For such problems, the paper band 1, on which the images of the sections of the drift tubes of the linear particle accelerator were previously painted with conducting paint (in order to materialize conducting zones such as 3, 3a which in fact are constituted for each gliding tube by a pair of rectangles located symmetrically on each side of a straight line, said rectangles reproducing, at a given scale, the sections of the gliding tubes by a plane passing through the axis of revolution of said tubes, said straight line being the image on paper band 1 of said axis of revolution) runs in accordance with the $z(t)$ law under the control of output 60 of the computer 23. Meanwhile the carriage 25, forming the voltage reader, runs along its rails 24 in accordance with the $r(t)$ law and collects the voltage or potential in three nodes A, B, C which have at this time the coordinates $(r, z)$, $(r+dr, z)$ and $(r, z+dz)$, $dr$ and $dz$ being the potential (or voltage) increments or differences between two adjacent nodes in the $r$ and $z$ directions.

It is accordingly possible to obtain the components $Fr$ and $Fz$ of the force acting on the particle of coordinates $r$ and $z$, said components depending upon the partial derivatives of the function U under study. The auxiliary differential analyser or computer 23 receives said potential increments and calculates again $r$ and $z$ and so on successively. The trajectory of said particle obtained (at least as projected in the plane $(r, z)$ ) and the field in each point of said trajectory are thereby obtained continuously.

If a system enjoying a revolution symmetry is under study, a space trajectory of said system can be reduced to a couple of trajectories in two planes at right angles. Such a reduction method is also applicable to the systems enjoying two perpendicular symmetry planes and allows therefore to resolve with a device according to the invention the focalization problems.

Such a device can also be used as a gradient simulator by a sweep method: the motion of the voltage reader relatively to the paper band is then controlled by $x$ and $y$ (or $r$ and $z$) considered as given not by an auxiliary computer but by a given sweep program, imparted by a sweep generator, e.g. similar to the sweep program in television cameras and receivers; it is therefore possible to determine, in each point swept by the program, the gradient of the field under study. Such working of the analogue partial derivative generator according to the invention is particularly adapted for the solving of problems involving the diffusion of heat or neutron flux in a nuclear reactor.

Our partial derivative generator can also be used, if necessary, as a curve follower. For this purpose, for recording operation, metallic conducting paint is substituted for ink and distributed by a pair of parallel pens. Then, for the reading operation, a suitable (known per se) hit and miss system obliges the voltage reader to follow the band comprised between the metallic curves. The reader delivers through a potentiometer a signal proportional to the motion thereof. Such metallic curves can be used many times.

It is therefore evident that the device according to the invention enables to solve in an easy and continuous manner problems involving partial derivatives systems which can be reduced to plane problems.

In particular, it enables the determination of a function or potential involving several variables.

Since certain modifications may be made in the device of the present invention without departing from the scope thereof, it is intended that all matter contained in the foregoing description and shown in the accompanying drawings be interpreted merely as illustrative and not in a limiting sense.

What we claim is:

1. Analogue device for determining the partial derivatives of a function of at least two variables comprising: an electrical network having a plurality of nodes disposed along several parallel lines, each node representing one point of a section of the space wherein said function is defined; a base element arranged for relative movement in a first direction relatively to said network, according to the variation law of a first one of said variables and carrying an homologue image of said section as at least one current-conducting zone; means for imparting on each current-conducting zone, at each moment, the potential corresponding to the boundary conditions of said function in said space; a plurality of gliding current-conducting leads connecting each node of said network to a corresponding point of said base element; a voltage reader arranged for movement, in a second direction relative to said network according to the variation law of a second one of said variables and reading the voltage differences existing, on the one hand, between a pair of adjacent nodes disposed along said first direction and, on the other hand, between one of the nodes in said pair and a third node adjacent thereto disposed along said second direction.

2. Analogue device as claimed in claim 1, further comprising means for varying in course of time the potential applied to at least one of said current-conducting zones.

3. Analogue device for determining the partial derivatives of a function of at least a first and a second variable, adapted to cooperate with an auxiliary computer capable of determining the actual values of said first and second variables corresponding, in an equation system including said partial derivatives, to the determined values of said partial derivatives, and comprising: a stationary resistor network having a plurality of nodes disposed along a pair of perpendicular directions, each node representing one point of a section of the space wherein said function is defined; a base element arranged for movement, relatively to said network, along one of said perpendicular directions, according to the variation law of said first variable and carrying an homologue image of said section as at least one current-conducting zone; means for imparting on each current-conducting zone, at each moment, the potential corresponding to the boundary conditions of said function in said space; a plurality of gliding current-conducting leads connecting each node of said network to a corresponding point of said base element; a voltage reader arranged for movement, relative to said network, along the other one of said perpendicular directions, according to the variation law of said second variable and reading the voltage differences existing, on the one hand, between a pair of adjacent nodes disposed along said one of said perpendicular directions and, on the other hand, between one of the nodes in said pair and a third node adjacent thereto disposed along said other one of said perpendicular directions; means for transfering to said auxiliary computer said voltage differences; means receiving from said computer a first control voltage, which is a function of the calculated value of said first variable, and positioning said base element relative to said network under the control of said first control voltage; and means receiving from said computer a second control voltage, which is a function of the calculated value of said second variable, and positioning said reader under the control of said second voltage.

4. Trajectory plotter for plotting a representation of the trajectory of a particle in a field which derives from a potential which is a given function of at least a first and a second variables and which is subject to a given equation system including the partial derivatives of said function relatively to said variables, comprising a stationary resistor network having a plurality of nodes disposed along a pair of perpendicular directions, each node representing one point of a section of the space wherein said function is defined; a base element movable, relatively to said network, along one of said perpendicular directions, according to the variation law of said first variable and carrying an homologue image of said section as at least one current-conducting zone; means for imparting on each current-conducting zone, at each moment, the potential corresponding to the boundary conditions of said function in said space; a plurality of gliding current-conducting leads connecting each node of said network to a corresponding point of said base element; a voltage reader movable, relative to said network, along the other one of said perpendicular directions, according to the variation law of said second variable and reading the voltage differences existing, on the one hand, between a pair of adjacent nodes disposed along said one of said perpendicular directions and, on the other hand, between one of the nodes in said pair and a third node adjacent thereto disposed along said other one of said perpendicular directions; an analogue differential computer solving said equation system and delivering, as a function of said voltage differences, the calculated values of said first and second variables which represent the calculated positions of said base element and said reader respectively; means for transferring to said analogue computer said voltage differences; means receiving from said computer a first control voltage, which is a function of the calculated relative position of said base element relatively to said network, and positioning said element relative to said network under the control of said first control voltage; and means receiving from said computer a second control voltage, which is a function of the calculated position of said voltage reader, and positioning said reader under the control of said second voltage.

5. Trajectory plotter as claimed in claim 4, wherein said transfer means include a first bar, comprising a first and a second series of transversal current-conducting bands, each band of said first series being connected to a different node of a first line of said network perpendicular to the motion of said reader relatively to said network whereas each band of said second series is connected to a different node of a second line of said network parallel and adjacent to said first line, and a second stationary bar, parallel to said first bar and comprising three longitudinal conducting strips, and wherein said voltage reader runs on said first and second bars perpendicularly thereto and comprises three longitudinal conducting strips, and wherein said voltage reader runs on said first and second bars perpendicularly thereto and comprises three conducting bridges, each one of said bridges carrying a pair of electric contacts, one of said contacts of each bridge running along a different one of said longitudinal strips whereas the other contacts of two of said bridges cooperate with the conducting bands of said first series and the other contact of the third bridge cooperates with the conducting band of said second series, whereby said three last-mentioned cooperating contacts are electrically connected, for any operative position of said reader, respectively to three nodes of said first and second lines constituting the apexes of a right-angle isosceles triangle.

6. Trajectory plotter as claimed in claim 4, wherein said computer includes also elements delivering at least one output for varying the potential applied to at least one of said current-conducting zones.

7. Analogue unit for solving an equation system including the partial derivatives of a function of at least a first and a second variable comprising an analogue device for determining the values of said partial derivatives and an auxiliary computer adapted to determine the actual values of said first and second variables corresponding in said equation system to the determined values of said partial derivatives, said analogue device comprising an electrical network having a plurality of nodes disposed along several lines, each node representing one point of a section of the space wherein said function is defined; a base element arranged for relative movement in a first direction relative to said network according to the variation law of said first variable and carrying an homologue image of said section as at least one current-conducting zone; means for imparting on each current-conducting zone at each moment the potential corresponding to the boundary conditions of said function in said space; a plurality of gliding current-conducting leads connecting each node of said network to a corresponding point of said base element; a voltage reader arranged for movement in a second direction relatively to said network according to the variation law of said second variable and reading the voltage difference existing, on the one hand, between a pair of adjacent nodes disposed along said first direction and, on the other hand, between one of the nodes in said pair and a third node adjacent thereto disposed along said second direction; means for transferring to said auxiliary computer said voltage differences; means receiving from said computer a first control voltage, which is a function of the calculated value of said first variable, and ensuring the relative movement between said base element and said network under the control of said first control voltage; and means receiving from said computer a second control voltage, which is a function of the calculated value of said second variable, and ensuring the movement of said reader, under the control of said second voltage.

References Cited in the file of this patent

UNITED STATES PATENTS

| | | |
|---|---|---|
| 2,569,646 | Wade et al. | Oct. 2, 1951 |
| 2,661,897 | Herzog et al. | Dec. 8, 1953 |
| 2,858,978 | Yetter | Nov 4, 1958 |

OTHER REFERENCES

British Journal of Applied Physics (Liebman et al.), p. 193–200; July 1953.

Analog Methods in Computation & Simulation (Soroka), 1954, p. 276–285.